United States Patent
Ferroni et al.

(10) Patent No.: US 11,958,639 B2
(45) Date of Patent: Apr. 16, 2024

(54) DEPLOYABLE SUPPORTING FRAME, AND HOUSING STRUCTURE PROVIDED WITH SUCH SUPPORTING FRAME, IN PARTICULAR FOR AEROSPACE APPLICATIONS

(71) Applicant: Thales Alenia Space Italia S.p.A. Con Unico Socio, Rome (IT)

(72) Inventors: Stefano Ferroni, Turin (IT); Antonia Simone, Turin (IT); Marco Nebiolo, Turin (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 407 days.

(21) Appl. No.: 17/311,235

(22) PCT Filed: Dec. 5, 2019

(86) PCT No.: PCT/IB2019/060485
§ 371 (c)(1),
(2) Date: Jun. 4, 2021

(87) PCT Pub. No.: WO2020/115701
PCT Pub. Date: Jun. 11, 2020

(65) Prior Publication Data
US 2022/0017241 A1   Jan. 20, 2022

(30) Foreign Application Priority Data

Dec. 5, 2018 (IT) .......................... 102018000010818
Dec. 5, 2018 (IT) .......................... 102018000010824

(51) Int. Cl.
*B64G 1/60* (2006.01)
*B64G 1/22* (2006.01)

(52) U.S. Cl.
CPC ............... *B64G 1/60* (2013.01); *B64G 1/222* (2013.01); *B64G 1/2223* (2023.08)

(58) Field of Classification Search
CPC ........ B64G 1/60; B64G 1/222; B64G 1/2222; B64G 1/2223
See application file for complete search history.

(56) References Cited

U.S. PATENT DOCUMENTS 5,016,418 A   5/1991   Rhodes et al.
5,243,718 A   9/1993   Shamie
(Continued)

FOREIGN PATENT DOCUMENTS

CN   206050100 U   3/2017
JP   H05 221392    8/1993
(Continued)

OTHER PUBLICATIONS

Reference Dwight et al. (EP Pub No. 0959524) Pub Date Nov. 24, 1999 (Year: 1999).*
(Continued)

*Primary Examiner* — Rodney A Bonnette
(74) *Attorney, Agent, or Firm* — McCarter & English, LLP

(57) ABSTRACT

A supporting frame for aerospace applications comprises a plurality of rods, which are arranged along two bases substantially parallel and opposite each other, and along two sides, which are substantially parallel and opposite to each other and are coupled to each other via the two bases; the rods are coupled to each other in a mutually rotating manner by nodes so as to be able to configure the supporting frame between a deployed operating condition and a compacted operating condition; the nodes are spaced apart from one another in the deployed operating condition and are each hinged to at least two of the rods; in the compacted operating
(Continued)

condition, each of the nodes is placed side by side with two adjacent nodes so as to form, together, two supporting members arranged at opposite longitudinal ends of the supporting frame and each being ring-shaped.

12 Claims, 8 Drawing Sheets

(56) References Cited

U.S. PATENT DOCUMENTS

| | | | |
|---|---|---|---|
| 5,327,700 A | | 7/1994 | Sorenson et al. |
| 2003/0024203 A1* | | 2/2003 | Kuo .................... G09F 15/0068 52/646 |
| 2017/0321414 A1* | | 11/2017 | Merrifield ................. E04B 1/19 |
| 2018/0099766 A1* | | 4/2018 | Dharmaraj ............... B64G 1/12 |

FOREIGN PATENT DOCUMENTS

| | | |
|---|---|---|
| WO | WO 92/12313 A1 | 7/1992 |
| WO | WO 2005/111343 A1 | 11/2005 |
| WO | WO 2009/148652 A1 | 12/2009 |

OTHER PUBLICATIONS

Italian Seach Report for IT 201800010824 dated Aug. 19, 2019.
PCT International Search Report and Written Opinion dated Apr. 14, 2020 for PCT/IB2019/060485.
PCT Second Written Opinion dated Feb. 8, 2021 for PCT/IB2019/060485.

* cited by examiner

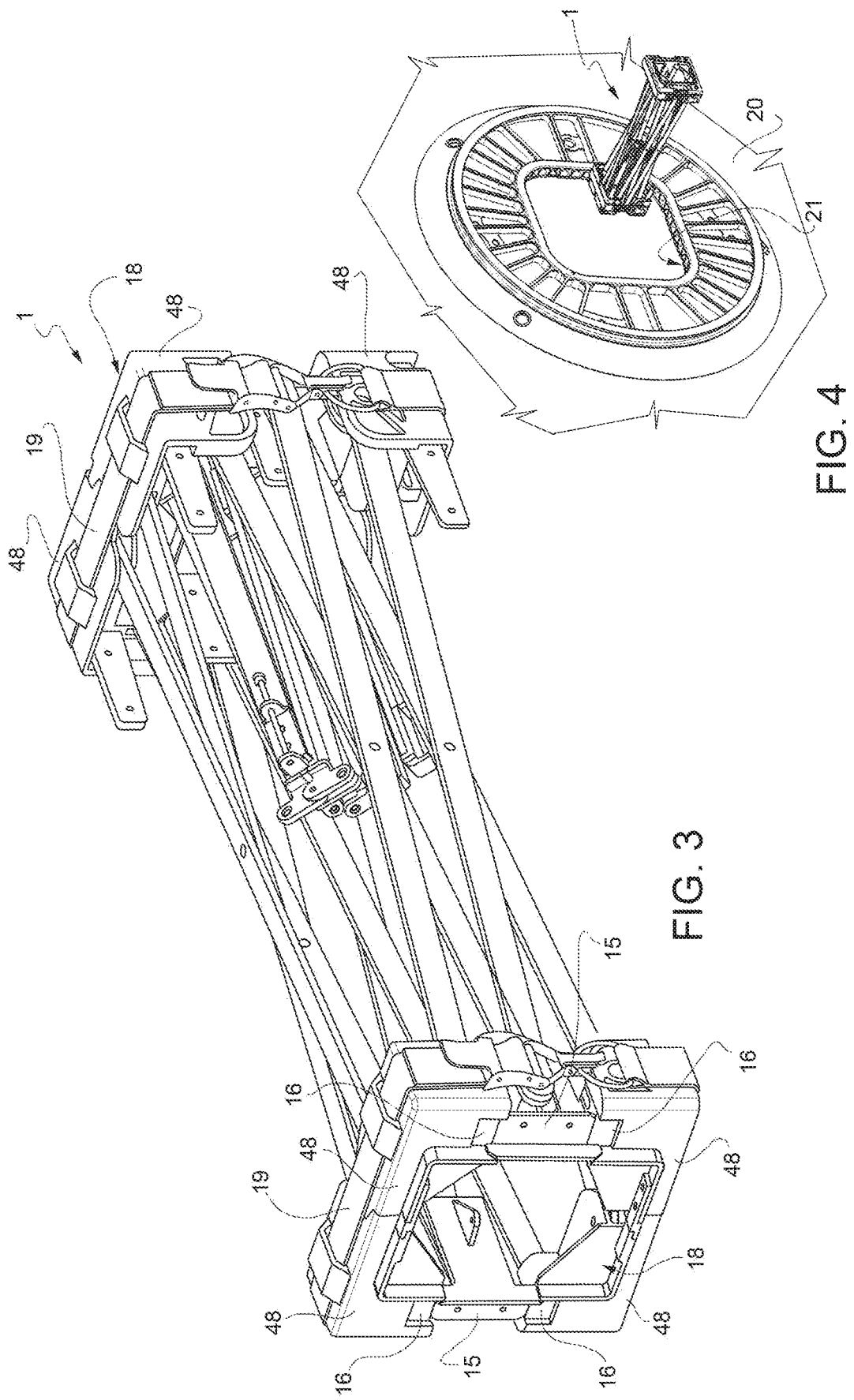

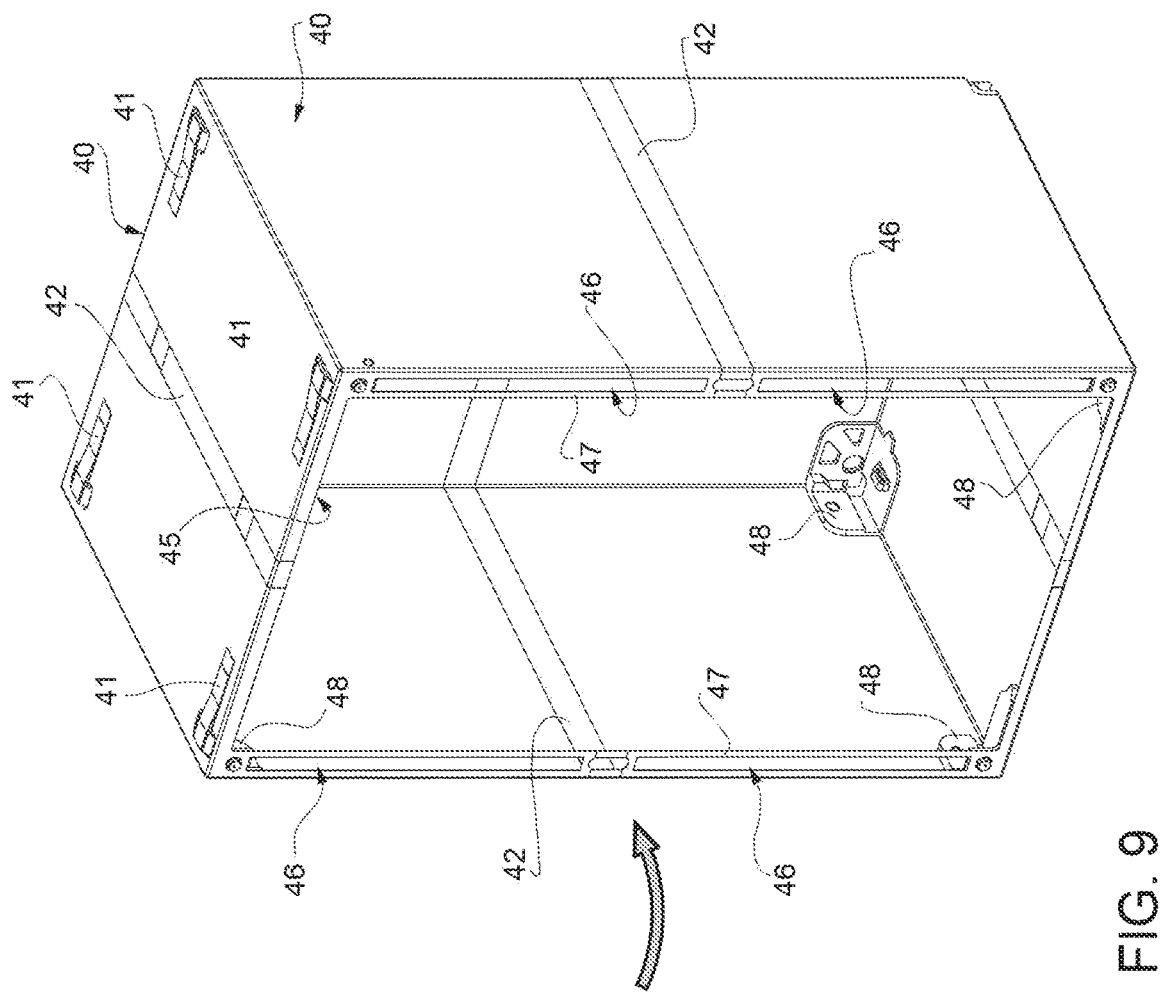
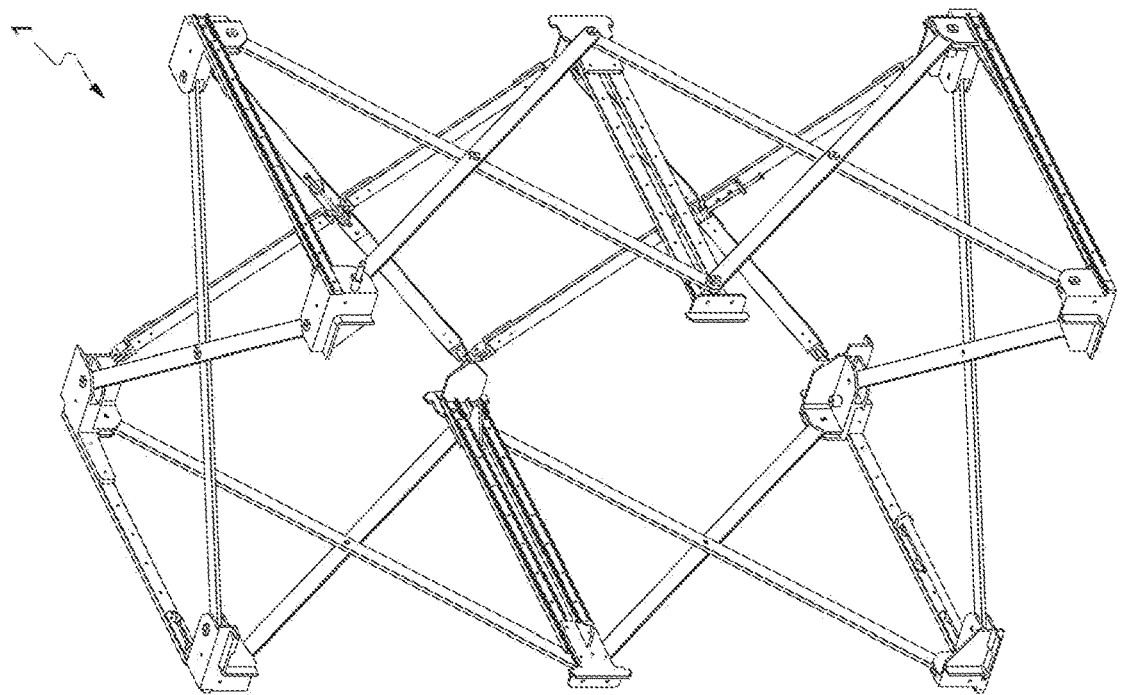
FIG. 9

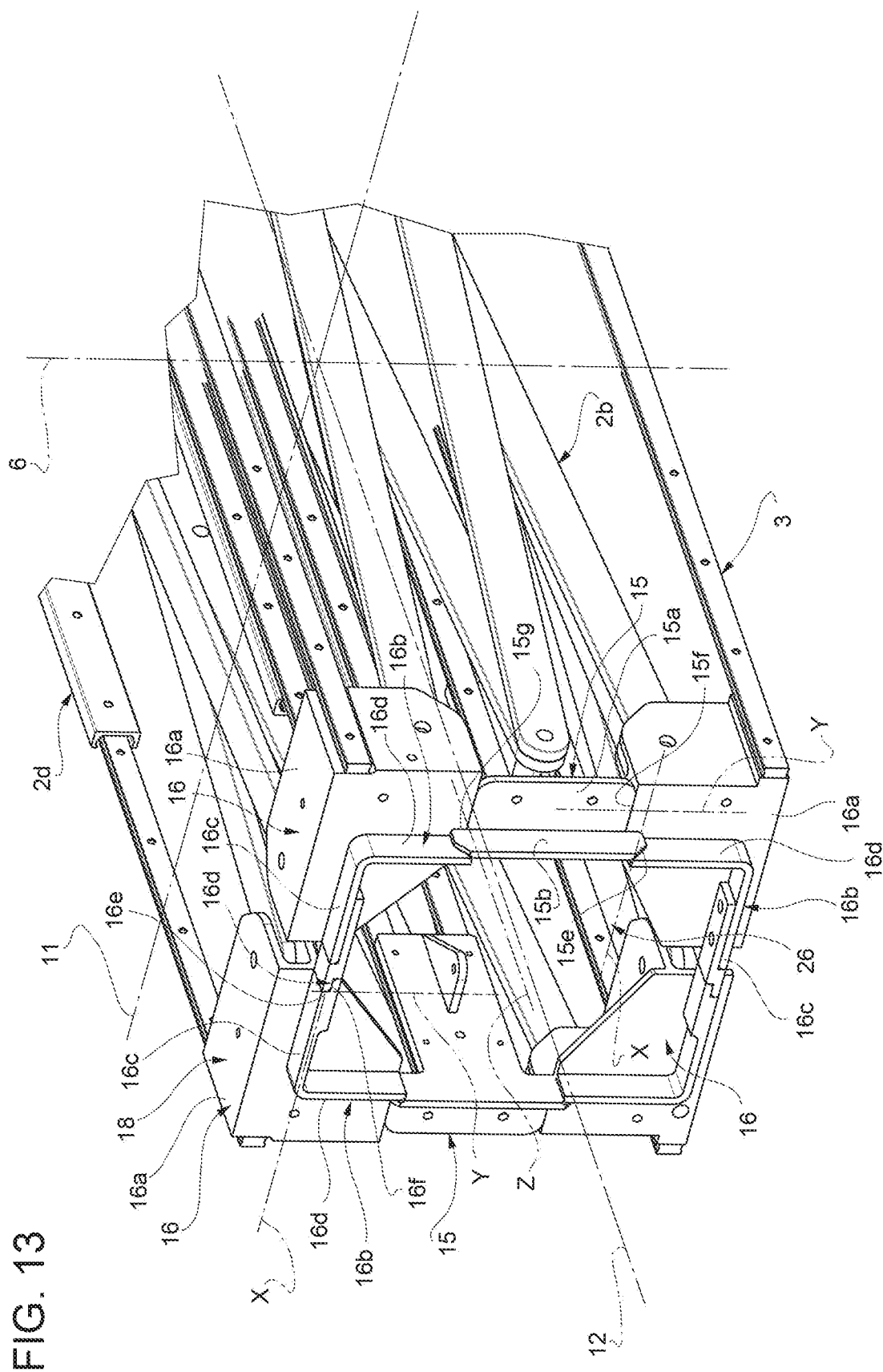

DEPLOYABLE SUPPORTING FRAME, AND HOUSING STRUCTURE PROVIDED WITH SUCH SUPPORTING FRAME, IN PARTICULAR FOR AEROSPACE APPLICATIONS

CROSS-REFERENCE TO RELATED APPLICATIONS

This patent application is a 35 U.S.C. § 371 National Stage filing of International Application No. PCT/M2019/060485, filed on Dec. 5, 2019, which application claims priority from Italian patent application no. 102018000010818 filed on Dec. 5, 2018 and no. 102018000010824 filed on Dec. 5, 2018, the entire disclosures of which are incorporated herein by reference.

TECHNICAL FIELD

The present invention relates to a deployable supporting frame for aerospace applications. In particular, the present invention relates to a supporting frame which, once deployed, forms a housing structure for use in a space station, for example to obtain a living cell (i.e. a crew housing), a shelf with two or more compartments, a radiation shelter for the crew, or a work area.

BACKGROUND ART

In the aerospace sector, it is known to set up or equip the interiors of an orbiting space station using structures that are constructed and prepared outside, launched towards the space station, and enter it through a hatch, normally closed by a door. Once inside the space station, such structures perform their specific function and have a relatively low degree of configurability and/or modularity. In fact, as mentioned above, the structures of the known type are already pre-assembled and have external dimensions and shapes that are generally standardized, such as to be able to enter through the hatches currently provided in space stations without particular contrivances. By way of example, reference is made to the structure called the "International Standard Payload Rack", which was designed and built for the International Space Station (ISS) programme and is suitable for orbiting the Earth.

With a view to reducing the size of the access hatches that are being designed for future space stations, there is a need to design structures that can be transported relatively easily, in a compact configuration of small dimensions, and can then be easily and quickly deployed and/or assembled directly inside the space station.

In this regard, especially in sectors other than aerospace, housings are already known that are provided with a folding or compactable supporting frame, i.e. a frame that can be configured in a folded condition, to allow its transport, or in a deployed condition to form the housing, to store objects and/or accommodate people. For example, in the transport sector, such a solution is known from US2006124802A1.

However, folding frames of a known type, in the folded configuration, do not have the structural characteristics such as to withstand the accelerations (more than ten times the acceleration of gravity) to which they would be subjected during space station launches.

At the same time, in the deployed configuration, the supporting frames must satisfy practically opposite requirements, i.e. have structural characteristics such as to be lightweight. Regarding the latter, weight reduction is an essential element for minimising the costs and energy required for launching into space. More specifically, the supporting frame should not be oversized, as in its deployed configuration the forces to which the supporting frame is subjected during in-orbit parking are relatively low (e.g., the supporting frame must withstand impulsive forces of about 70 N, i.e., a force caused by accidental kicking by a crew member).

Another aspect to consider is the following: folding frames of a known type, in the folded configuration, are not the right size for passing through the space hatches that are currently being designed.

At the same time, in the deployed configuration, the support frames must satisfy practically opposite requirements, i.e. they must be of such dimensions as to define a living space with a minimum volume, established by the agencies responsible for space programmes.

U.S. Pat. No. 5,016,418A discloses a deployable structure that synchronously deploys in both length and width and is suitable for use as a structural component for orbiting space stations or large satellites. The structure is designed with maximum packing efficiency so that large structures may be collapsed and transported in the cargo bay of the Space Shuttle. The structure is made up of interconnected structural units, connected with hinged and fixed connections at connection nodes.

CN206050100U relates to an extending arm, which is applied to an aerospace environment and is formed by arranging a plurality of folding and unfolding units in series: the length of the extending arm can be changed by changing the number of the folding and unfolding units.

DISCLOSURE OF INVENTION

The purpose of the present invention is, therefore, to provide a deployable supporting frame for aerospace applications, which meets the needs set out above in a simple and economical manner and, in particular, has a small size, such as to be able to pass through the space hatches that are currently being designed and/or allows a housing structure to be assembled directly inside a space station in a simple and fast manner. In addition, this housing structure should be configurable in order to be able to adapt the space and equipment inside the space station effectively according to the needs of the crew.

According to the present invention an aerospace supporting frame, as defined in claim 9, is provided.

According to the present invention, moreover, an aerospace housing structure, as defined in claim 1, is provided.

BRIEF DESCRIPTION OF THE DRAWINGS

The invention will now be described with reference to the appended drawings, which illustrate a non-limiting embodiment thereof, wherein:

FIG. 3 partially illustrates the aerospace supporting frame while it is kept in the compacted operating condition by belt elements;

FIG. 4 illustrates the transfer of the aerospace supporting frame in the compacted operating condition through an access hatch of a space station;

FIG. 9 illustrates, in a perspective and exploded view, a further aerospace housing structure formed from the aerospace supporting frame according to the dictates of the present invention;

FIG. 13 illustrates, on a larger scale, a detail of FIG. 2.

BEST MODE FOR CARRYING OUT THE INVENTION

Figure 1:
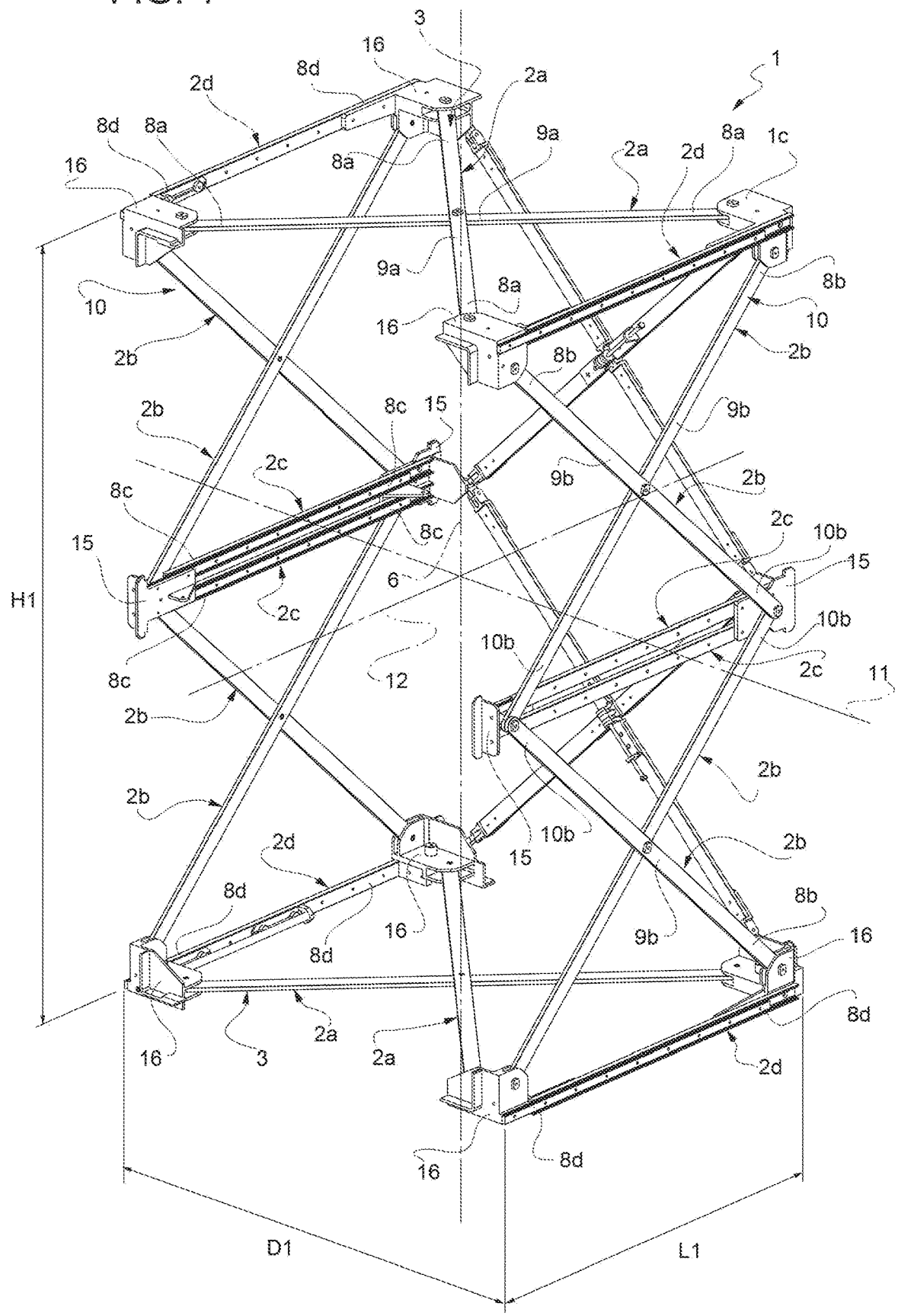
FIGS. 1 and 2 illustrate, in perspective, a preferred embodiment of the aerospace supporting frame according to the present invention, in a deployed operating condition and a compacted operating condition, respectively.
Figure 2:
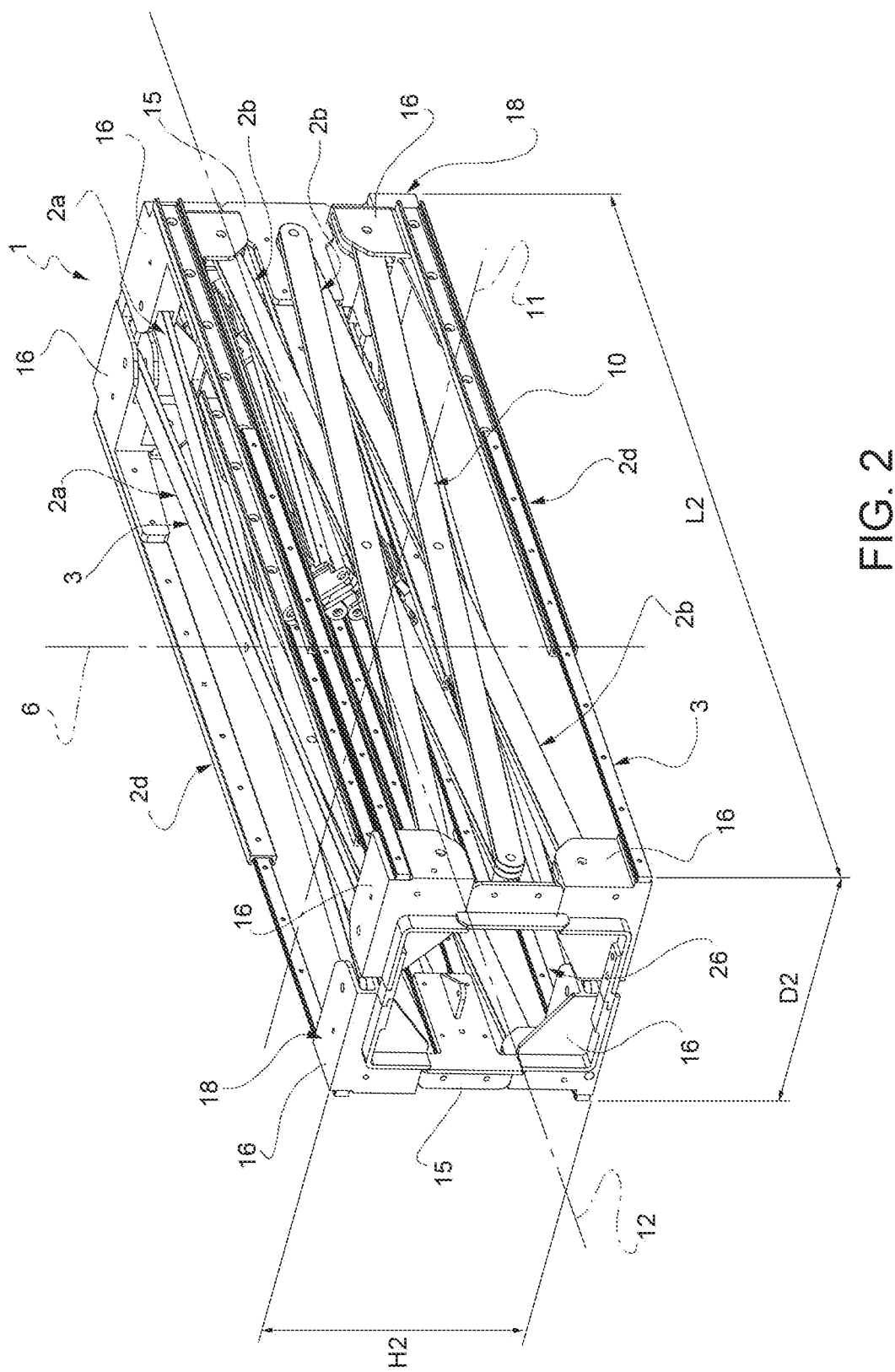

In FIGS. 1 and 2, reference number 1 denotes an aerospace supporting frame, having a substantially parallelepiped shape and comprising a plurality of rods 2a,2b,2c,2d that are coupled so as to be able to rotate relative to each other and thereby manually configure the frame 1, between a deployed operating condition (FIG. 1) and a compacted or folded operating condition (FIG. 2).

The rods 2a are arranged to form two bases 3, which lie on planes spaced apart and substantially parallel to each other, and face each other along a direction 6 which, in the deployed condition during use, is vertical. In particular, as may be seen in FIG. 1, each base 3 consists of a pair of rods 2a, which comprise respective ends 8a and respective intermediate portions 9a: the intermediate portions 9a are hinged to each other so as to form a cross. The hinge axes provided at the ends 8a and the intermediate portions 9a are parallel to the direction 6. Preferably, the rods 2a have a fixed length and, in more detail, are straight.

At the same time, the rods 2b are arranged on two sides 10 of the supporting frame 1. The sides 10 lie on planes spaced apart and substantially parallel to each other, are connected to each other by the rods 2a of the bases 3, and face each other along a direction 11, which is orthogonal to the direction 6 and therefore, in the deployed condition during use, is horizontal. The rods 2b are similar to the rods 2a, from a constructive point of view and from the point of view of mutual assembly. In particular, the rods 2b are the same length as the rods 2a. In the preferred example illustrated, for each side 10, there are two pairs of rods 2b, which thus form two crosses. In this case, as can be seen in FIG. 1, each of the rods 2b comprises:

an intermediate portion 9b hinged to an intermediate portion 9b of another rod 2b, an end 8b coupled in a rotating manner to an end 8a of one of the rods 2a, and an end 10b coupled in a rotating manner to an end 10b of another rod 2b.

The hinge axes of the rods 2b are parallel to the direction 11.

Thanks to this hinging of the rods 2a and the rods 2b, there is a pantograph structure or leverage on each side 10 and on each base 3: starting from the deployed condition, said pantograph leverages allow the bases 3 to approach each other along the direction 6 and the sides 10 to approach each other along the direction 11 relatively easily and quickly in order to switch to the compacted condition. In general, due to the manner in which the rods of the frame 1 are hinged, according to a preferred aspect of the present invention, by changing from the deployed condition to the compacted condition, the height of the frame 1 along the direction 6 (corresponding substantially to the distance between the bases 3) decreases from a value H1 to a value H2; the width of the frame 1 along the direction 11 (corresponding substantially to the distance between the sides 10) decreases from a value D1 to a value D2; and the length of the bases 10 and therefore of the frame 1 along a direction 12 orthogonal to the directions 6 and 11 increases from a value L1 to a value L2.

As mentioned above, this result is obtained by means of the rods 2a and 2b that are not telescopic, but are only rotatable. The aforementioned rods 2c and 2d, on the other hand, have a length that is adjustable, for example they are defined by telescopic rods, i.e. with two parts sliding with respect to each other. The rods 2c and 2d are parallel to the direction 12 and are arranged along the sides 10. When the rods 2a and 2b rotate to switch from the deployed condition to the compacted condition, the rods 2c and 2d must extend from the length value L1 to the length value L2. Preferably, a locking system, not illustrated in detail, is provided to stop the extension and possibly the shortening of each of the rods 2c and 2d, for example to stop the reciprocal sliding of the two parts of which each rod 2c,2d consists.

As shown in FIG. 1, the rods 2c are arranged substantially centrally between the bases 3 (in relation to the direction 6), while the rods 2d are substantially coplanar to the bases 3, i.e. they are arranged at the edges of the frame 1, at virtual intersections between the bases 3 and the sides 10.

In particular, for each side 10 there are two rods 2c, arranged in proximity, even if spaced apart along the direction 6. On each side 10, the rods 2c comprise respective ends 8c that are carried by two coupling elements 15 opposite each other and hinged to the ends 10b of the rods 2b.

Similarly, the rods 2d comprise respective ends 8d that are carried by coupling elements 16, arranged at the eight vertices of the frame 1 and thus defining respective angle elements. Each of the coupling elements 16 is hinged to one of the ends 8a and to one of the ends 8b, in addition to being coupled to one of the ends 8d of the rods 2d.

It is apparent from FIG. 1 that, in the deployed condition, the coupling elements 15 and 16 are spaced apart from each other. According to one aspect of the present invention, as seen in FIG. 2, at least some of the elements 15 and 16 (i.e. at least the elements 16) are arranged to be in contact against each other in the compacted condition, so as to form, together, a pair of supporting members 18, arranged at the opposite longitudinal ends of the frame 1 (along the direction 12).

In other words, the elements 15 and 16 define respective nodes that are hinged to the ends of the rods and that cooperate with each other, in the compacted condition, to create a system suitable for absorbing loads.

In the compacted condition, in fact, the ends 8a, 8b, 10b, 8c and 8d are coupled to the members 18, which effectively support the loads along the directions 6 and 11.

As seen in the detail of FIG. 13, each of the supporting members 18 has a ring shape, and its nodes are arranged in series along this ring. In other words, each node is interposed between, and is in contact against, two adjacent nodes. Considering any pair of nodes that are adjacent along the ring path, the coupling mode for coupling these nodes defines at least two contact bearings directed along respective X and Y directions that are orthogonal to each other and are parallel, respectively, to the directions 11 and 6. In other words, at the coupling between two adjacent nodes, each of these nodes has two abutment shoulders that are orthogonal to said directions X and Y, respectively, and are in contact against corresponding abutment shoulders of the adjacent node. In this way, the relative displacement between adjacent nodes is prevented along each of the directions X and Y, either way, without generating hyperstatic constraints. Thanks to the contact constraints along the directions X and Y, the nodes of each support member 18 discharge the loads that are directed along the directions 6 and 11 onto each other along the ring path, so as to effectively support such loads, as mentioned above.

This coupling mode is explained in detail below, considering the specific solution illustrated by way of a non-limiting example.

Each of the nodes defined by the elements 16 is an angle node comprising a body 16a and a flap 16b, protruding cantilevered from the body 16a along the direction 12. Each flap 16a comprises two straight portions 16c and 16d that are orthogonal and joined to each other, and are parallel to the directions 11 and 6, respectively. In particular, the portions 16c are aligned with each other parallel to the direction 11, and at least one of the portions 16c protrudes relative to the body 16a of its node so as to couple to the portion 16c of the adjacent node. More particularly, the bodies 16a of two adjacent nodes are spaced apart from each other; at the same time, the end of one of the two portions 16c forms a seat 16d, which has a step shape, is engaged by the end of the other portion 16c and is bounded by two abutment shoulders 16e and 16f, that are orthogonal to the aforementioned directions X and Y and are in contact with corresponding shoulders of the other portion 16c.

As a result, the flaps 16b define the contact coupling along both the directions X and Y, in the case of adjacent nodes both defined by elements 16.

Let's consider now the case in which the two adjacent nodes are defined by an element 16 and an element 15. In the illustrated case, the element 15 comprises a body 15a and a flap 15b, which protrudes cantilevered from the body 15a along the direction 12 and is straight and parallel to the direction 6.

The flap 15b protrudes relative to the body 15a parallel to the direction 6 so as to couple to the portion 16d of the adjacent node, which is defined by the element 16 (according to variants not illustrated, the portion 16d protrudes from the body 16a to couple to the flap 15b).

In particular, the end of the flap 15b has an abutment shoulder 15e that is orthogonal to the direction X and is in contact against a corresponding shoulder of the end of the portion 16d. At the same time, the body 15a has an abutment shoulder 15f that is orthogonal to the Y direction and is in contact against a corresponding shoulder of the body 16a.

In this specific case, therefore, the contact bearings along the directions X and Y are defined, one, by the flaps 15b and 16b and, the other, by the bodies 16a and 16b.

In addition to the contact bearings along the two directions X and Y, the adjacent nodes defined by the elements 15 and 16 are preferably also in contact against each other along a direction Z, parallel to the direction 12. In the particular illustrated example, the end of the flap 15b has an abutment shoulder 15g in contact against the body 16a of the adjacent node, along this direction Z (according to non-illustrated variants, it is the end of the portion 16d that is resting on the body 15a).

In this way, the elements 15 and 16 have a reference system, one with respect to the other, for defining a correct relative positioning of the nodes in the compacted condition.

As can be seen in FIG. 3, again in the compacted condition, the supporting members 18 can be wound by belts or similar extended elements, preferably flexible (ropes, cables, etc.), to retain the elements 15 and 16 in a fixed position, in contact with each other, and to prevent the frame 1 from deploying autonomously and/or accidentally. In particular, an intermediate cover is placed between each member 18 and the relative belt 19. This intermediate cover is defined, for example, by two C-shaped half-shells, or by four covering elements, each of which has an angular shape and is coupled to a respective element 16 so as to cover the latter (while the elements 15 may remain uncovered). In particular, such covering elements are defined by the same elements 48 that will be described below with reference to FIG. 9.

As shown in FIG. 4, the compacted condition is used to launch the frame 1 into an orbiting space station 20 (partially illustrated). As mentioned above, the loads due to space launch are absorbed by the nodes defined by the elements 15 and 16, with a consequent advantage in saving mass from a structural point of view. In fact, in this way, it is possible to lighten the structure of the rods that are arranged between the members 18 in the compacted condition.

At the same time, the dimensions of the frame 1 defined by the height value H2 and the width value D2 are extremely small, as explained above, so that the frame 1 can enter the station 20 through its relatively small hatch 21.

Figure 7:
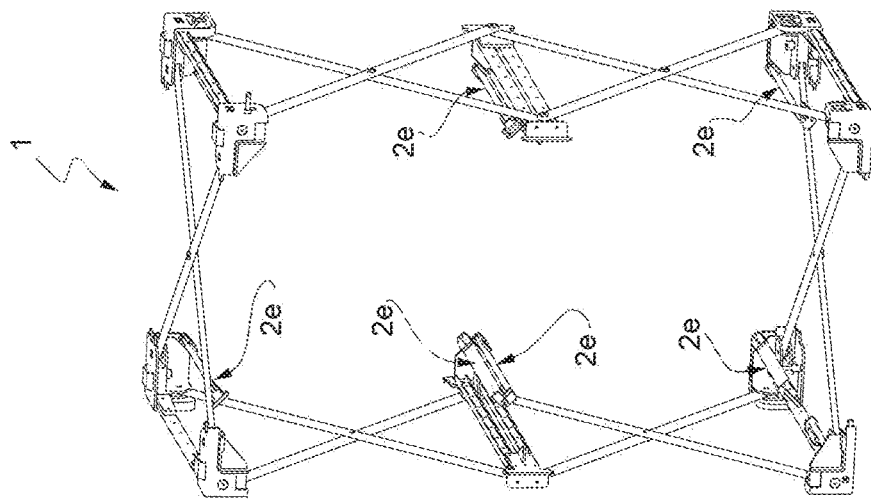
FIGS. 5 to 7 illustrate some steps for configuring the aerospace supporting frame from the deployed operating condition to the compacted operating condition.
Figure 6:
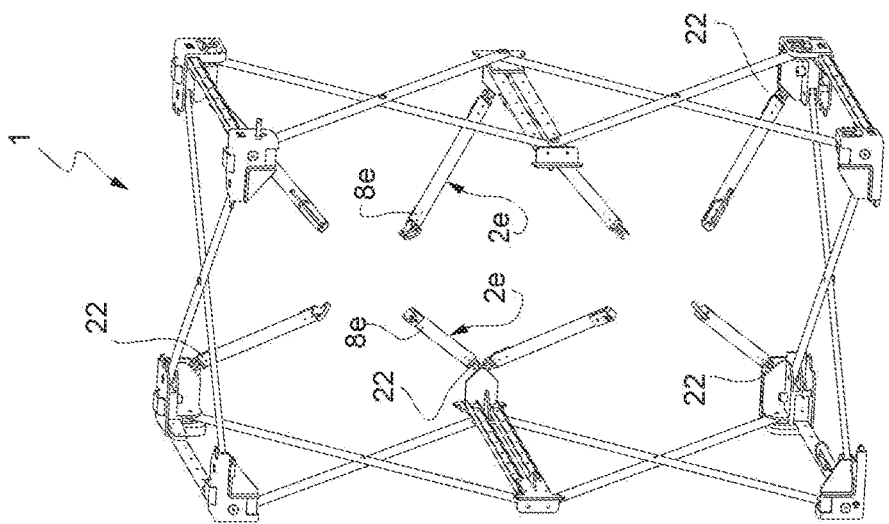
Figure 5:
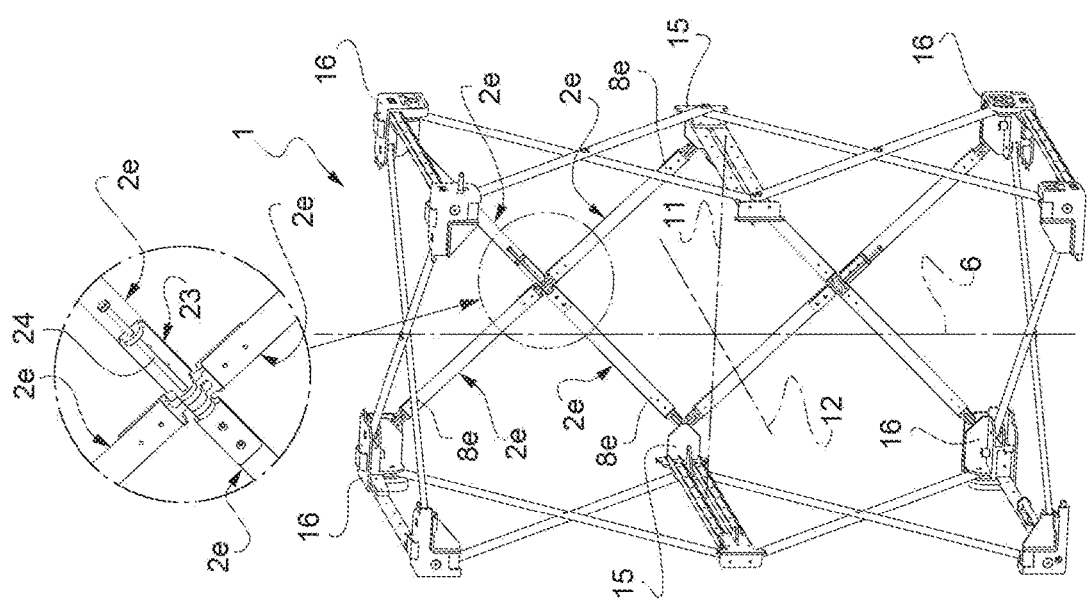

With reference to FIGS. 5 to 7, considering the opposite longitudinal ends of the frame 1 along the direction 12, preferably the frame 1 is without rods on one side (i.e. at the front end), while it comprises a plurality of rods 2e on the other side (at the rear end). The rods 2e comprise respective ends 8e that are coupled to the coupling elements 15 and/or 16 by means of joints 22 (FIG. 6) that allow the rods 2e to be arranged in a first position (FIG. 5) or in a second position (FIG. 7).

In particular, to allow the joints 22 to be connected, the elements 15 and 16 arranged at the rear end may differ slightly from the elements 15 and 16 arranged at the front end, in terms of structure/shape and/or dimensions.

In the first position, the rods 2e lie on a plane orthogonal to the direction 12 and are fixed together in a releasable manner by at least one fastening device 23. As shown in the enlarged area of FIG. 5, for example, the device 23 comprises a locking rod 24 that is coupled in a sliding manner to one of the rods 2e to move to and from a locked position, wherein it is simultaneously fastened to the ends of four rods 2e so as to hold them in a fixed position with respect to each other, thus forming a cross.

In this way, the rods 2e perform a stiffening function for the frame 1 at the rear end in the deployed condition.

In the second position, on the other hand, the rods 2e are uncoupled from each other and protrude cantilevered from respective coupling elements 15 and 16, in positions facing and parallel to the rods 2c and 2d. To switch from the deployed to the compacted condition, the devices 23 must first be released to uncouple the rods 2e from each other (FIG. 6), and then the rods 2e must be rotated around the joints 22 to arrange them in their second position (FIG. 7). After these operations, and after unlocking the extension of the rods 2c and 2d, it is possible to close the frame 1 in the compacted condition by bringing the coupling elements 15 and 16 closer together so as to touch. During this approach, as mentioned above, the pantograph leverages defined by the rods 2a and 2b close, so as to bring the rods 2d closer together along the directions 6 and 11, while maintaining the parallelism of the rods 2c and 2d. This closing or compacting movement ends when the elements 16 come into contact with the elements 15 and, thus, form the two supporting members 18. In this compacted condition, as shown in FIG. 2, the rods 2a, 2b, 2c and 2d continue to remain along the bases 3 and sides 10 of the frame 1 and define a cavity 26 that is elongated along the direction 12, houses the rods 2e, and is open at the two opposite longitudinal ends of the frame 1.

In order to switch from the compacted condition to the deployed condition, the above operations are obviously performed in the reverse order.

When the frame 1 is arranged in its deployed condition, it is normally used to form a housing structure 30, as shown in FIGS. 8 to 12.

For this purpose, the frame 1 is joined to at least one covering element, arranged along at least one of the bases 3 and/or sides 10. In the specific case of FIG. 8, the structure 30 is assembled by mounting, in a releasable manner, at least one rigid panel 32 in the space inside the frame 1. In particular, two horizontal panels 32 are arranged to cover the bases 3, as floor and roof, while an additional horizontal panel 32 is coupled to the elements 15 in a fixed position, as an intermediate shelf. In this way, the structure 30 defines a shelf that is partially open at the side and rear, as well as being fully open at the front to ensure access to its interior.

In addition, the structure 30 comprises at least two uprights 34, which are parallel to the direction 6, are arranged at the front ends of sides 10 of the frame 1 and, in particular, are attached to the elements 15 and 16 that are arranged at said front ends. The uprights 34 are provided with respective rows of fasteners or connectors 27, which can be used as an alternative to each other to couple one or more components to the frame 1 in a desired position.

For example, the connectors 27 of the uprights 34 can be used to couple a hook 35 to hang objects and/or a support arm 36 for a keyboard or tray, at any height.

Figure 10:
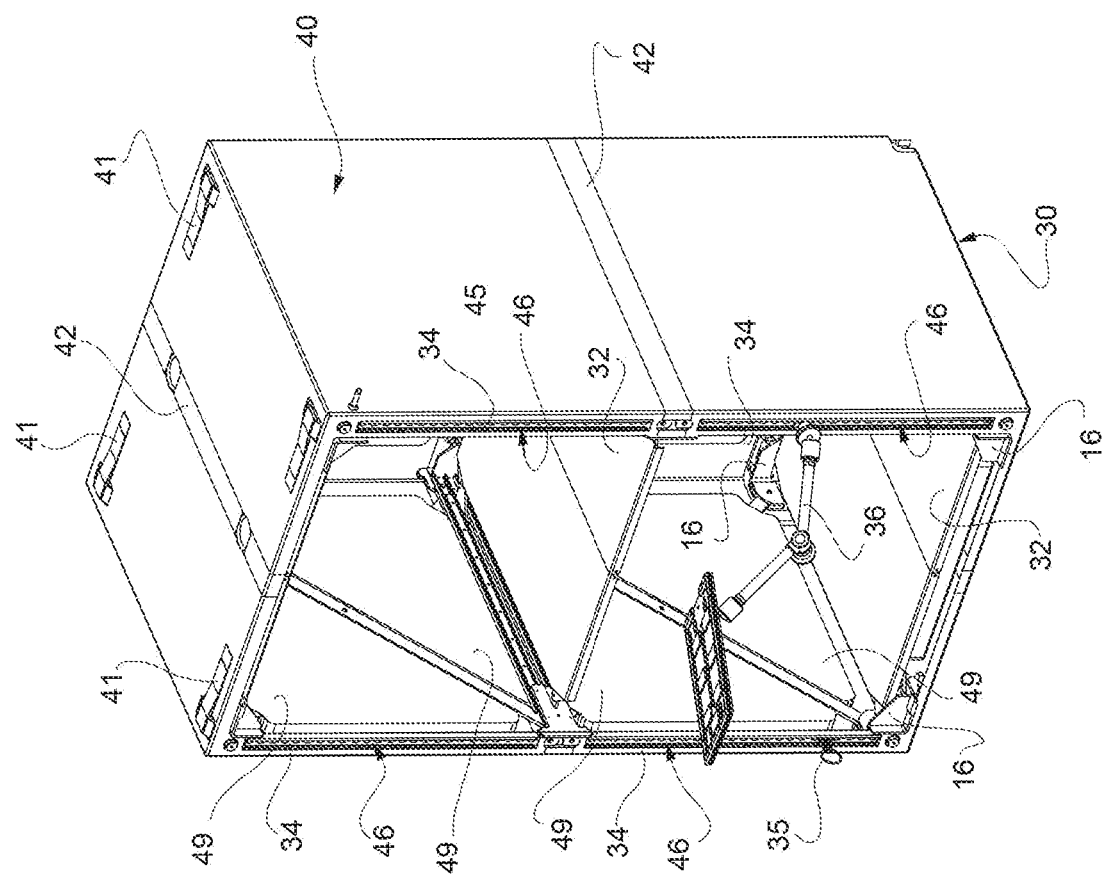
FIGS. 10 to 12 show different possible configurations of the aerospace housing structure in FIG. 9.

With reference to FIGS. 9 and 10, in this configuration the structure 30 comprises a canvas cover 40, which is arranged around the frame 1, as the outer covering of at least one of the bases 3 (the upper one), the sides 10, and the rear end of the frame 1.

Preferably, the canvas 40 is tensioned when coupled to the frame 1, so as to form a tensile structure and further stiffen the frame 1, as with an umbrella. In this regard, advantageously, the canvas 40 carries belt elements 41 and/or elastic elements 42 suitable for tensioning the canvas 40 around the frame 1. As an alternative or in combination with the elements 41,42, the material of the canvas 40 has elastic properties that allow it to be slightly smaller than the outer dimensions of the frame 1, at rest, and to extend slightly to be tensioned when placed around the frame 1.

Figure 8:
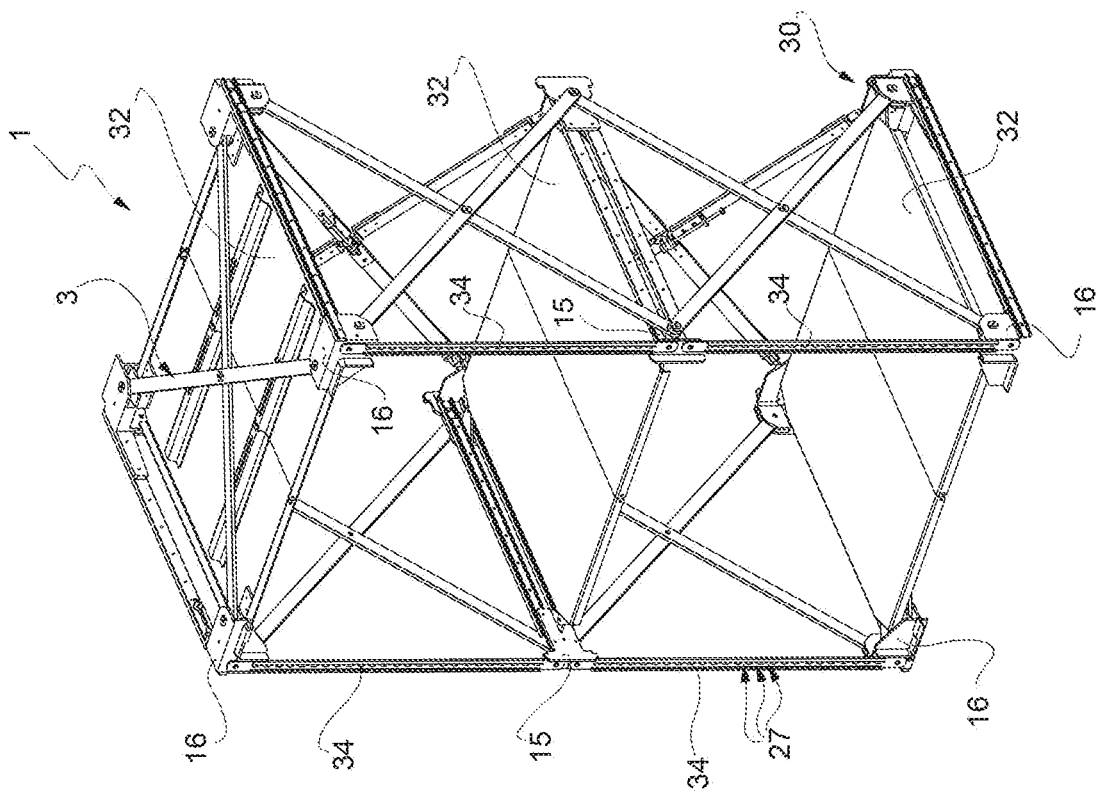
FIG. 8 is a perspective view of an aerospace housing structure formed from the aerospace supporting frame according to the dictates of the present invention.

In this configuration, thanks to the canvas 40, the open shelf in FIG. 8 becomes a closed structure along the entire periphery, except for a front opening 45 that allows users to access the internal space of the structure 30 (FIG. 10). The opening 45 is defined laterally by two frontal portions 47 of the canvas 40. The portions 47 partially cover the uprights 34 and the elements 15 and 16 and have respective vertical eyelets 46 that allow access to the connectors 27 of the uprights 34 and/or access to front connection portions forming part of the elements 15,16.

The canvas 40 has a parallelepiped shape, i.e. the same shape as the frame 1. Preferably, the canvas 40 is supported by a plurality of rigid angle elements 48, only some of which are visible in FIG. 9. In particular, the elements 48 are arranged at the vertices of the canvas 40, preferably inside the latter. The elements 48 are coupled in a releasable manner to the frame 1: in particular, they overlap the elements 16 and are fixed to the latter, for example by interlocking and/or by male-female type couplings and/or by additional fixing pins.

The eight elements 48 are used not only to tension the canvas 40 and/or to protect said canvas 40 from possible tears, which could be caused by the metal parts and/or protruding parts of elements 16 of the frame 1, but are also used to define the intermediate cover between the members 18 and the respective belts 19, when the frame 1 is in the compacted condition, as already mentioned above. As can be seen in FIG. 3, the elements 48 are preferably provided with respective loops, on an outer surface thereof, for the passage and fixing of the belt 19. Moreover, advantageously, the elements 48 contribute to the alignment and interconnection between the nodes defined by the elements 16: in fact, in addition to being coupled to the corresponding elements 16 that are covered, the four elements 48 are coupled to each other at each member 18, two by two, by means of a coupling of the interlocking type and/or the male-female type.

Again, with reference to FIG. 10, the housing structure 30 (configured as a shelf) further comprises a plurality of anechoic and/or insulating panels 49, arranged inside the frame 1 at the sides 10 and/or at the rear end, opposite the opening 45. The panels 49 are fixed to the frame 1 and/or to the canvas 40 in a releasable manner, in a way not shown in detail, e.g. by means of Velcro stitched or glued to the inner surface of the canvas 40.

Figure 12:
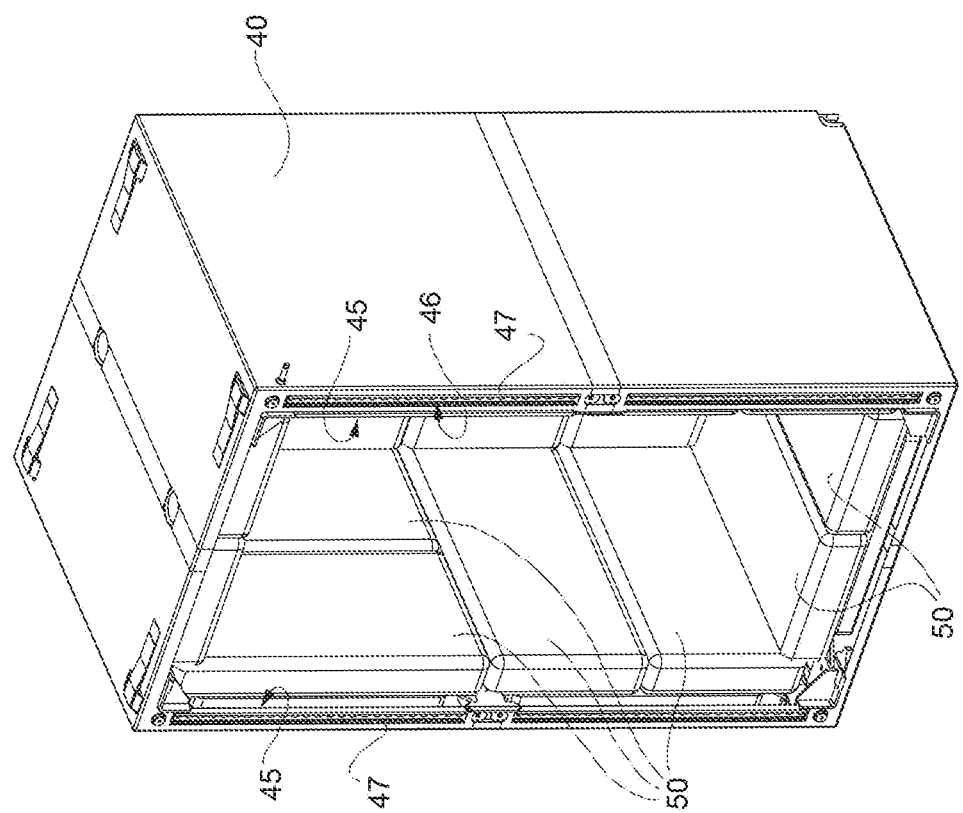
Figure 11:
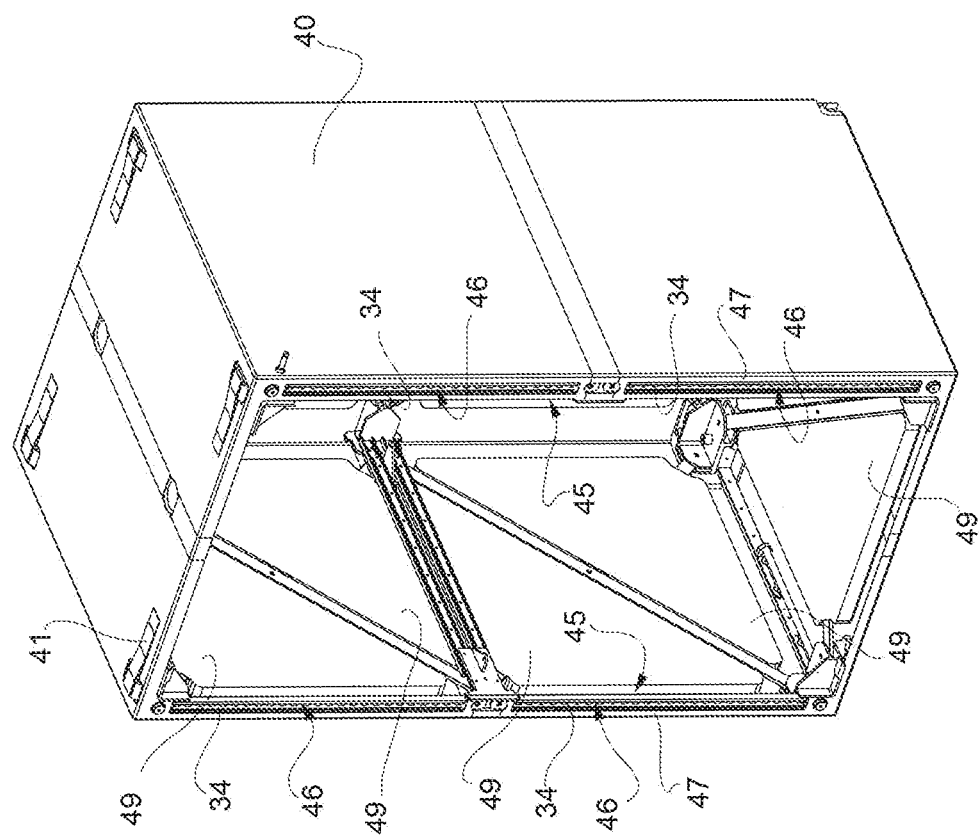

FIGS. 11 and 12 show how the housing structure 30 can be configured as a living cell for a crew member of the station 20 or as a radiation shelter, again for crew members.

In particular, in the configuration shown in FIG. 11, the housing structure 30 is without panels 32, while the panels 49 are also provided at the bases 3 and/or the rear end of the frame 1. In a manner not illustrated, the structure 30 may also comprise covering elements arranged above the rods 2c and/or 2d.

In the configuration of FIG. 12, on the other hand, the housing structure 30 comprises a plurality of anti-radiation panels 50 (defined, for example, by containers containing water) that are arranged inside the frame 1 and are attached directly or indirectly to the latter and/or to the canvas 40 in a releasable manner, not illustrated in detail. For example, the panels 50 overlap the panels 49 and are attached to the latter by Velcro.

The structure 30 further comprises a plurality of interfaces, not illustrated, of the electrical type (for signal transmission and/or power supply), of the sensor type, or of the hydraulic or pneumatic type. In this regard, in particular, the panels 49 and 50 and the canvas 40 are provided with pre-cut holes or pre-cut or pre-marked areas, not illustrated, in order to obtain openings that are arranged in various positions, defined in the design phase, and allowing, in use, the passage of ducts (air ventilation ducts) and/or wiring from the outside to the inside of the housing structure 30. In combination or as an alternative to the possibility of obtaining such openings, the canvas 40 bears one or more wirings, which are preferably arranged integrated in the canvas 40 as weaving and/or sewing elements.

From the above, it ensues that the frame 1, in addition to being deployable, is extremely light, thanks to the rods, but also has structural characteristics that allow it to support the loads that are present during space launches, in the compacted operating condition.

In fact, as far as load resistance is concerned, the members 18 only form in the compacted condition and contribute to stiffening the frame 1 specifically during the space launch. In particular, the frame 1 is positioned so that the launch direction is orthogonal to the direction 12, so that the rods (preferably made of carbon) are completely unloaded and the loads are supported only and exclusively by the nodes arranged, together, to form the members 18.

At the same time, in the deployed operating condition, i.e. during normal use, the members 18 are broken down into several elements 15 and 16 which are separate from each other, without adversely affecting the overall weight of the frame 1. In fact, in the deployed operating condition, structural rigidity is essentially conferred by the rods 2a,2b,2c, 2d,2e, which can be designed so as to have a very low weight, without causing the frame 1 to be oversized as a whole, since they must withstand relatively low loads (corresponding to those of an accidental kick by a crew member, the so-called "crew kick load").

At the same time, the frame 1 has a high volume reduction in shifting from the deployed condition to the compacted condition.

As a result, on the one hand, in the deployed condition, the dimensions L1, D1, H1 can be set so as to meet the minimum size requirements required by regulations and/or agencies responsible for space programmes, with regard to the volume of living space inside the structure 30.

On the other, thanks to the reduction obtained for the dimensions D2 and H2 in the compacted condition, the frame is able to pass through the small hatches provided in modern generation space stations. Again, in the compacted condition, the frame 1 is compatible with transport inside the bags already used today, with standard defined dimensions, without having to design dedicated transport containers.

In addition, in the deployed operating condition, the frame 1 allows a liveable volume to be obtained quickly. The volume can be configured for different purposes, e.g. as a crew living cell, as a storage shelf, as a support shelf for components and equipment, as a work area, as a temporary radiation shelter, etc. Consequently, the structure 30 is multifunctional or multi-purpose and is particularly suitable for inside space stations. In fact, all the coupling systems provided to connect the various components (directly or indirectly) to the frame 1 are of the releasable type, so that it is possible to assemble, disassemble, and modify the arrangement of these components quickly, with the aim of optimizing the space inside the space station according to the specific needs of the crew during the mission.

Lastly, it is clear from the foregoing that modifications and variations may be made to the frame 1 described with reference to the appended figures, while remaining within the sphere of protection of the present invention, as defined in the appended claims.

In particular, the coupling mode between the nodes defined by the elements 15 and 16 could be different from the one illustrated and described by way of example, but always aimed at defining a ring shape or path for the members 18, in which each node is coupled in contact against two adjacent nodes, without having a hyperstatic structure, but in such a way as to transfer the loads in a reciprocal manner along the ring path.

The invention claimed is:

1. An aerospace housing structure comprising:
an aerospace supporting frame comprising:
a) a plurality of rods each comprising two opposite ends, said rods being arranged so as to define two bases parallel and opposite each other, two sides, which are parallel and opposite each other and are coupled to each other by said bases, a rear area and a front area, opposite to said rear area,
b) a plurality of joint nodes that couple said ends in a mutually rotating manner so as to be able to configure said supporting frame between a deployed operating condition and a compacted operating condition; said nodes being spaced apart from one another in the deployed operating condition and each being hinged to at least two of said rods; in the compacted operating condition, each of said nodes being placed side by side with two adjacent nodes, so as to be arranged in series and form, together, two supporting members arranged at opposite longitudinal ends of the supporting frame,
a canvas, which is arranged around said supporting frame at least at one of said bases, at said sides and at said rear area, and is removably coupled to said supporting frame, when said supporting frame is in the deployed operating condition;
wherein said canvas has a front opening at said front area, allowing users to access the internal space of said aerospace housing structure, when said supporting frame is in the deployed operating condition.

2. The aerospace housing structure according to claim 1, wherein tensioning means for tensioning said canvas around said supporting frame when said canvas is coupled to said supporting frame.

3. The aerospace housing structure according to claim 1, wherein rigid angle elements are arranged in fixed positions on said canvas at respective vertices of the supporting frame, and are releasably coupled to said supporting frame, when said supporting frame is in the deployed operating condition.

4. The aerospace housing structure according to claim 1, further comprising at least two uprights, which are fixed to said supporting frame when said supporting frame is in the deployed operating condition, said uprights being arranged orthogonally to said bases and at said sides, and each comprising a row of connectors that can be selected alternatively to one another to couple a component to said housing structure.

5. The aerospace housing structure according to claim 1, wherein, when said supporting frame is in the compacted operating condition, for any pair of adjacent nodes, the two nodes of each pair define a first node having first shoulders and, respectively, a second node having second shoulders, that are coupled in contact respectively with the first shoulders of said first node along directions that are orthogonal to each other and to the corresponding first and second shoulders.

6. An aerospace housing structure comprising:
an aerospace supporting frame comprising:
a) a plurality of rods each comprising two opposite ends, said rods being arranged so as to define two bases parallel and opposite each other, two sides, which are parallel and opposite each other and are coupled to each other by said bases,
b) a plurality of joint nodes that couple said ends in a mutually rotating manner so as to be able to configure said supporting frame between a deployed operating condition and a compacted operating condition; said nodes being spaced apart from one another in the deployed operating condition and each being hinged to at least two of said rods; in the compacted operating condition, each of said nodes being placed side by side with two adjacent nodes, so as to be arranged in series and form, together, two supporting members arranged at opposite longitudinal ends of the supporting frame,
a canvas, which is arranged around said supporting frame at least at one of said bases, at said sides and at said rear area, and is removably coupled to said supporting frame, when said supporting frame is in the deployed operating condition;

rigid angle elements, which are arranged in fixed positions on said canvas, at respective vertices of the supporting frame, and are releasably coupled to said supporting frame, when said supporting frame is in the deployed operating condition;

retention means arranged around said supporting members when said supporting frame is in the compacted operating condition, so as to maintain said nodes in positions placed side by side to each other;

wherein said rigid angle elements are arranged between each of said supporting members and the corresponding retention means, when said supporting frame is in the compacted operating condition.

7. An aerospace supporting frame comprising:

a plurality of rods each comprising two opposite ends; said rods being arranged so as to define two bases parallel and opposite each other, and two sides, which are parallel and opposite each other and are coupled to each other by said bases;

a plurality of joint nodes that couple said ends in a mutually rotating manner so as to be able to configure said supporting frame between a deployed operating condition and a compacted operating condition; said nodes being spaced apart from one another in the deployed operating condition and each being hinged to at least two of said rods; in the compacted operating condition, each of said nodes being placed side by side with two adjacent nodes so as to be arranged in series and form, together, two supporting members arranged at opposite longitudinal ends of the supporting frame;

wherein, when said supporting frame is in the compacted operating condition, for any pair of adjacent nodes, the two nodes of said pair define a first node having first shoulders and a second node having second shoulders, the first shoulders of said first node are coupled in contact respectively with the second shoulders of said second node along respective directions that are orthogonal to each other and to the corresponding first and second shoulders.

8. The aerospace supporting frame according to claim 7, wherein said rods on each of said sides and on each of said bases, form a pantograph structure.

9. The aerospace supporting frame according to claim 8, further comprising additional rods that, in the deployed operating condition, are arranged at one of said longitudinal ends; said additional rods comprising respective ends that are coupled to said nodes in a rotating manner, so that they can be folded into a storage position, in which they are parallel to said bases and to said sides.

10. An aerospace supporting frame comprising:
a) a plurality of rods each comprising two opposite ends, said rods being arranged so as to define two bases parallel and opposite each other, two sides, which are parallel and opposite each other and are coupled to each other by said bases;
b) a plurality of joint nodes that couple said ends in a mutually rotating manner so as to be able to configure said supporting frame between a deployed operating condition and a compacted operating condition; said nodes being spaced apart from one another in the deployed operating condition and each being hinged to at least two of said rods; in the compacted operating condition, each of said nodes being placed side by side with two adjacent nodes so as to be arranged in series and form, together, two supporting members arranged at opposite longitudinal ends of the supporting frame;

wherein said rods, on each of said sides and on each of said bases, form a pantograph structure, wherein, in the deployed operating condition, said sides have a first length and are spaced apart from each other by a first width and said bases are spaced apart from each other by a first height;

wherein, in the compacted operating condition, said sides have a second length and are spaced apart from each other by a second width and said bases are spaced apart from each other by a second height; and wherein said first height and first width greater, respectively, than said second height and second width, and said first length is smaller than said second length.

11. The aerospace supporting frame according to claim 10, wherein said rods comprise, for each said side:

two pairs of first rods, the two rods of each pair having a fixed length and comprising respective intermediate portions hinged to each other; and second rods that are parallel and/or coplanar to said bases and have an adjustable length between at least two values, corresponding to said first length and respectively to said second length.

12. The aerospace supporting frame according to claim 11, wherein said rods comprise, for each said base, a single pair of third rods having a fixed length and comprising respective intermediate portions hinged to each other.

* * * * *